United States Patent [19]

Barr

[11] Patent Number: 5,015,991

[45] Date of Patent: May 14, 1991

[54] ALARM SYSTEM FOR VEHICLE AUTOMATIC TRANSMISSION

[76] Inventor: William A. Barr, P.O. Box 13, Gibson Island, Md. 21056

[21] Appl. No.: 499,646

[22] Filed: Mar. 27, 1990

[51] Int. Cl.$^5$ ............................................. B60Q 11/00
[52] U.S. Cl. .................................... 340/456; 340/457; 340/438
[58] Field of Search ...................... 340/457, 457.3, 456, 340/459, 438; 200/61.88, 61.91; 74/DIG. 7

[56] References Cited

U.S. PATENT DOCUMENTS

| | | | |
|---|---|---|---|
| 3,381,269 | 4/1968 | Fierbaugh et al. | 340/457.3 X |
| 3,723,968 | 3/1973 | Kelly | 340/457.3 |
| 4,353,055 | 10/1982 | Kawakatsu et al. | 340/457 |
| 4,380,752 | 4/1983 | Reynolds | 340/457 |
| 4,482,885 | 11/1984 | Mochida | 340/457 |
| 4,871,994 | 10/1989 | Takeda et al. | 340/457 |
| 4,888,577 | 12/1989 | Dunkley et al. | 340/456 X |

Primary Examiner—Joseph A. Orsino
Assistant Examiner—Brian R. Tumm
Attorney, Agent, or Firm—Scrivener and Clarke

[57] ABSTRACT

An alarm system which signals to the driver a first alarm whenever he opens a vehicle door and the selector lever of an automatic transmission is not in its full park position. The system signals to the driver and also to persons external to the vehicle a second different alarm whenever, in addition, the driver leaves his seat and the selector lever is not in its full park position or the parking pawl fails to properly engage the parking gear even though the selector lever is in its proper park position. A manual switch may be operated to selectively disconnect the alarms, with an automatic operator being provided to close this switch should it accidently be left in its open condition.

12 Claims, 2 Drawing Sheets

ALARM SYSTEM FOR VEHICLE AUTOMATIC TRANSMISSION

BACKGROUND OF THE INVENTION

The present invention relates generally to an alarm system for an automatic transmission of an automotive vehicle and more specifically to an alarm system for producing a first warning alarm signal whenever a vehicle door is opened and the transmission selector lever is not fully in its park position, producing a second warning alarm signal, distinct from the first and preferably discernible to the exterior of the vehicle whenever the driver moves off his seat with the selector lever not fully in its park position, or produces a third audible and/or visual signal whenever the lever is fully in its park position but the parking pawl cannot engage the parking gear due either to broken connection between the lever and the rooster comb or a maladjustment in that connection.

DESCRIPTION OF THE PRIOR ART

Automatic transmissions can often deceive an inattentive driver, particularly one long accustomed to a mechanical stick shift, into believing his vehicle is locked against movement when in fact it isn't. For example, a driver can position his vehicle while its motor is still running with its front end facing up a slope and with the selector lever engaged in the drive position. When the driver first removes his foot from the brake pedal the vehicle remains motionless due to the residual driving effort of the motor through the transmission. Should the driver now open the door before he turns the ignition key to off and start to leave the vehicle as he switches the key to off (intending to leave the key in place as he might in his own driveway) the vehicle can suddenly start to roll backward, with the open door sweeping the driver with it possibly resulting in grave bodily injury or even death.

Alarm systems for automatic transmissions which signal when the selector lever is not fully in its park position are known but usually such systems require at least two events to take place before the alarm is activated, as, for example, both the vehicle door must be opened and the driver must leave his seat. Such an arrangement is shown and described in the U.S. Pat. No. 4,482,885 to Mochida and is quite suitable when a neglectful drive stops on level ground.

SUMMARY OF THE INVENTION

Desirably, an alarm should be sounded before the driver leaves his seat and while he is still in position to apply the foot brake, the emergency brake or the transmission brake, the latter, as soon as applied, deactivating the alarm. Hence one object of the invention is to provide a warning system designed to prevent the type of serious accident described above.

Should the driver, however, open the door with the selector lever not in its park position and ignore the ensuing alarm, it is another object of the invention to provide a second alarm, preferably more strident than the first alarm and preferably clearly discernable from the exterior of the vehicle so that not only is the increased danger impressed on the driver but also on passers-by to warn them of the possibility that the vehicle may start to move out of control. With the second alarm signalling the instant the driver's weight is relieved from the seat, he is provided an opportunity to return quickly to his seat and apply the brake.

There is a further danger with automatic transmissions wherein the brake pawl may be prevented from entering the space between a pair of teeth on the transmission parking gear even though the selector lever has been moved into its full park position. This could be caused, for example, by broken linkage between the selector lever and rooster comb or by maladjustment of the linkage whereby the parking pawl tooth never enters a space in the parking gear. This is an exceptionally dangerous condition since the driver may leave the vehicle with the full expectation that the transmission brake is applied and the vehicle thus locked against movement. It is another object of the invention, therefore, to provide a linkage responsive switch to activate a third alarm distinct from the first two and desirably including a lighted signal, preferably on the dash board, warning that the parking linkage is broken or maladjusted, or otherwise advising that the vehicle is not parked even though the transmission lever is in its full park position.

Whenever an alarm system of the foregoing nature is employed, it is highly desirable that means be provided for disconnecting the alarm or alarms from the power source when the vehicle is undergoing repairs. Such an arrangement is shown in the U.S. Pat. No. 3,723,968 to Kelly. In that patent, a double throw switch 30 is shown which simultaneously disconnects an alarm 16 and the ignition circuit. In the event the mechanic should neglect to close the switch upon completion of repairs, the driver will be made aware of this condition when the vehicle fails to start. Desirably, such a switch is located beneath the hood or the like to prevent accidental opening by a passenger, say. Thus when the car fails to start, the driver must get out of the car, unlock the hood, search for the switch and close it, all of which is time consuming and annoying. It is therefore another object of the present invention to provide a disconnect switch, also preferably located in a substantially inaccessable position, which can be manually moved to an open position but is automatically closed when the ignition key is moved to its start position.

Other objects and their attendant advantages will become apparent as the following detailed description is read in conjunction with the accompanying drawings wherein:

DETAILED DESCRIPTION OF THE INVENTION

Figure 1:
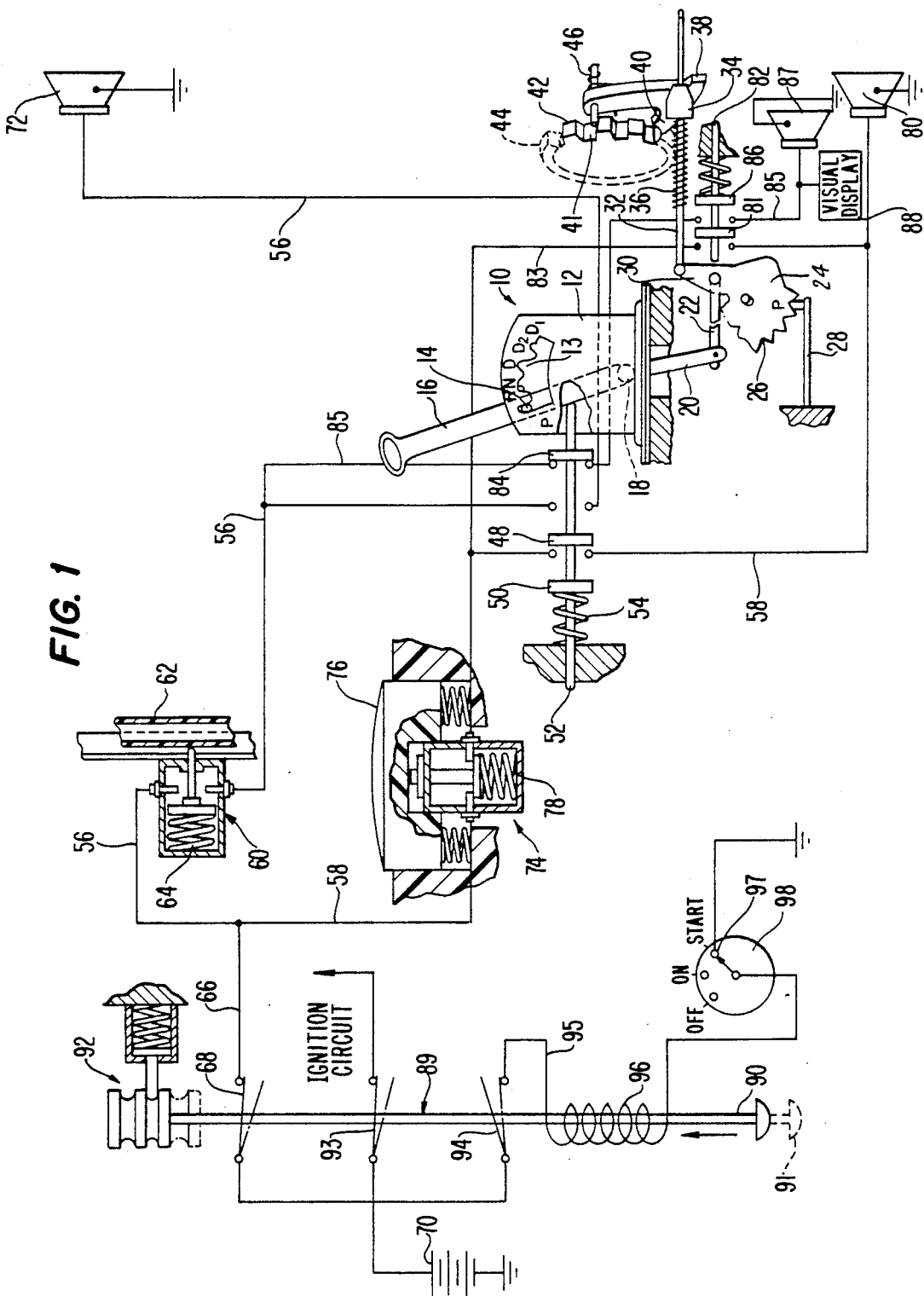
FIG. 1 is a schematic drawing of the parking brake alarm system of the present invention.

Referring now to the drawings and particularly FIG. 1, 10 designates a conventional gear selector assembly for an automatic transmission for a motor vehicle. The assembly includes a detent plate 12 having notches 13 therein for engagement by a spring-loaded pin 14 of a gear selector lever 16 having a depressable button or the like (not shown) for moving the pin 14 downwardly clear of a notch in order to permit the lever 16 to be moved to the desired position, e.g., park, reverse, neutral, drive, etc. The lower end of the lever is pivoted at 18, and rigidly depending from the lever 16 is an arm 20 connected by a link 22 to a conventional notched plate 24 known in the art as a "rooster comb". The plate 24 has notches 26 corresponding to the notches 13 in the detent plate 12, a spring loaded detent 28 engaging the notches 26. The rooster comb has an arm 30 to which is pivoted the inner end of a rod 32 slideably carring a cone 34 urged by a spring 36 away from the rooster comb arm 30. In every position of the shift assembly except park the cone is clear of a parking pawl 38 having a parking tooth 40 engageable with spaces 41 between teeth 42 on a parking gear 44. The pawl 38 is urged by a torsion spring 46 away from the gear 44.

When the vehicle is to be parked, the gear selector lever 16 is moved to the park position causing the arm 30 of the rooster comb 24 to move the rod 32 in the direction of the pawl 38. The cone spring 36 is stronger than the torsion spring 46 so that the cone 34 is able to move the pawl tooth 40 towards the parking gear 44. It is a known fact that 90% of the time the tooth engages the radially outer face of a parking wheel tooth 42 and when this occurs, the cone spring 36 is compressed while the cone is stopped by the temporarily immovable pawl as the selector lever 16 and rod 22 are moved into their full park positions. As soon as the vehicle moves a slight distance, a tooth space 44 on the parking gear aligns with the pawl tooth 40 allowing the cone 34 to be driven by its spring 36 to its full park position behind the pawl to move the park tooth 40 into the aligned tooth space thereby parking the vehicle.

What has been described above is well known and conventional but from what has been described it can be seen that the driver may forget to move the selector lever 16 into its park position, or he may not move the lever fully into its park position, or there may be some derangement, as for example, broken linkage or maladjustment of the linkage between the lever 16 and rooster comb 24 which prevents the pawl from being moved towards the parking gear even though the lever 16 is in its full park position. Regardless of the condition preventing the vehicle from being parked, it is the purpose of the invention to warn initially the driver of the vehicle's unparked condition as soon as he opens the vehicle door and then, should the initial warning be ineffective, to warn the driver with greater urgency as well as passers-by, should the driver leave his seat with the selector lever 16 not in its park position. To this end, in accordance with the invention, first and second control switches 48, 50 are mounted on a common actuator rod 52 which is urged by a spring 54, into camming engagement with the lever 16 when the latter is in its park position. The switches 48, 50 are positioned to close onto contacts in respective conductors 56, 58 whenever the lever is set to any position other than the park position.

A third control switch 60 is provided in conductor 56 in series with the switch 48 and is positioned to close whenever a door 62 of the vehicle is opened. As can be seen the switch 60 is urged by a spring 64 towards its closed position to connect the conductor 56 through a common supply conductor 66 and a normally closed, later described switch 68 to the vehicle power supply 70. The numeral 72 designates a first alarm device connected in series with the switches 48, 60 to produce a first alarm signal, either audible or visual when both of switches 48, 60 are closed.

A fourth control switch 74 is provided in conductor 58 in series with switch 50 and is positioned to close whenever the driver leaves his seat 76 in the automotive vehicle. As can be seen the switch 74 is biased by a spring 78 towards its closed position to connect the conductor 58 through the supply conductor 66 and normally closed switch 68 with the power supply 70.

The numeral 80 designates a second alarm device in series with the seat switch 74 and shift lever controlled switch 50 to produce a second alarm signal, distinctly different from the first alarm signal, when both the seat switch 74 and the lever controlled switch 50 are closed.

In accordance with the invention a fifth control switch 81 is mounted on a spring loaded plunger 82 engaging the arm 30 of the rooster comb 24. The switch 81 is connected in series with the fourth seat controlled switch 74 and the second alarm device 80 and positioned to be closed whenever the tooth 40 of the parking pawl 38 is not engaged with a space 41 between a pair of teeth 42 of the parking gear 44, because the rooster comb is not in its park position due either to breakage in or maladjustment of the linkage between the lever 16 and rooster comb 24. The second alarm device 80 produces the second alarm signal when both the fourth seat controlled switch 74 and the fifth, linkage controlled switch 81 are closed. As can be seen, the fifth pawl control switch 81 is in a circuit 83 parallel with the second lever controlled switch 50 so that the second alarm device 80 produces the second alarm signal whenever the fourth seat controlled switch 74 and fifth linkage controlled switch 81 are closed, regardless of the open or closed condition of the second, lever controlled switch 50.

In accordance with the invention, the first alarm device 72 produces a first alarm signal restricted to the interior of the vehicle, the second alarm device not normally being expected to generate an alarm signal so long as the operator responds to the first alarm signal and moves the shift lever 16 to its park position, with the pawl 38 also moving to its park position. In accordance with the invention, the second alarm signal is not only distinctly different from the first alarm signal but it is more urgently demanding and is signalled primarily to the exterior of the vehicle to warn the driver should he have stopped the vehicle on level ground and have left the vehicle without placing the shift lever 16 in its park position. The second alarm signal will remind the driver to return to the vehicle at once and will also warn passers-by that the vehicle may be in an unsafe condition.

Though the closed switch 81 and second alarm 80 will signal a broken or maladjusted shift linkage after the shift lever has been moved to park, the invention also contemplates producing a third signal under the foregoing conditions whenever the driver's door is opened. To this end a third switch 84 is mounted on the shift-lever-controlled plunger 52. Switch 84 closes only when the shift lever 16 is in its full park position of FIG. 1 at which point the switches 48, 50 are open. When the shift lever 16 is in any position except park, the switch 84 is open. The switch 84 is connected in a circuit 85 in series with door controlled switch 60, a second switch 86 carried on the plunger 82 controlled by the rooster comb, and a third alarm 87, which may be a voice type audio alarm announcing that the parking linkage is either broken or maladjusted. In addition a dash board visual alarm 88 may light with a printed message to the same effect.

It will be apparent from the foregoing description, that where a switch 81 is employed to energize the second alarm when the rooster comb fails to go into its full park position in response to movement of the shift lever to that position, the only ready means for turning off the second alarm under the above circumstances is for the driver to sit on his seat to open the switch 74. This is not always practical so, in accordance with the invention, manual switch means for disconnecting all of the alarms from the power source are provided. This disconnect means not only permits disconnection of the alarm when their continued signals would serve no purpose but it also permits them to be disconnected when the vehicle is to be serviced. With reference to the left side of FIG. 1, the numeral 89 refers generally to a manual control switch mechanism which includes a switch operating shaft 90 and knob 91 which are located on the vehicle in a position such as under the hood, in the trunk, etc. not readily accessible to the occupants of the vehicle. The manual switch control mechanism includes detent means 92 for releasably retaining the manually operable switch in its solid-line, connect-position or in its dashed-line disconnect-position as shown in FIG. 1. The switch means 9 includes the previously mentioned switch 68 which in its normal solid line position connects the alarm circuits to the vehicle power source 70. Also controlled by the switch means 89 is a normally closed switch 93 for disconnecting the ignition circuit from the power source when the warning system is also intentionally disconnected. In addition, there is a normally open switch 94 in a circuit 95 connecting a solenoid 96 with the starter contact 97 of the ignition switch 98.

It should be apparent from the foregoing description that when a mechanic or the driver opens the alarm and ignition circuit switches 68 and 93 by pulling the knob 91 to its lower dashed line position, he closes the switch 94. Now, should the mechanic forget to move the knob and hence the switches back to the solid line positions, as soon as the driver turns the ignition key to the starter position the solenoid 96 is energized to move the switch rod 90 upwardly in FIG. 1, closing the switches 68, 93 and enabling the starter motor to be turned over in the conventional manner to start the vehicle. At the same time the solenoid switch 94 is moved to its normal open position to disconnect the solenoid from the power source. Should the solenoid, for some reason, fail to actuate the switch mechanism then the operator has no choice but to locate the knob 91 and move the mechanism manually back to its normal operating position.

Operation of the invention should be clear from FIGS. 2 through 5 where like numerals are applied to like parts described in connection with FIG. 1.

Figure 2:
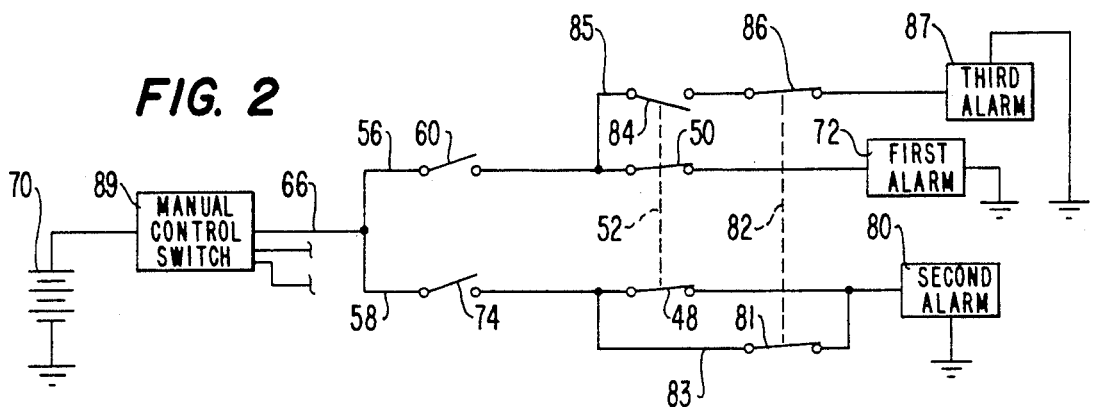
FIGS. 2 through 5 are schematic diagrams illustrating various combinations of switch positions depending on conditions of the vehicle and driver.

FIG. 2 illustrates the normal driving condition of the alarm system as a vehicle is driven with its door and seat switches 60, 74 both in their open positions and all alarm means 72, 80, 87 disconnected from the power source.

Figure 3:
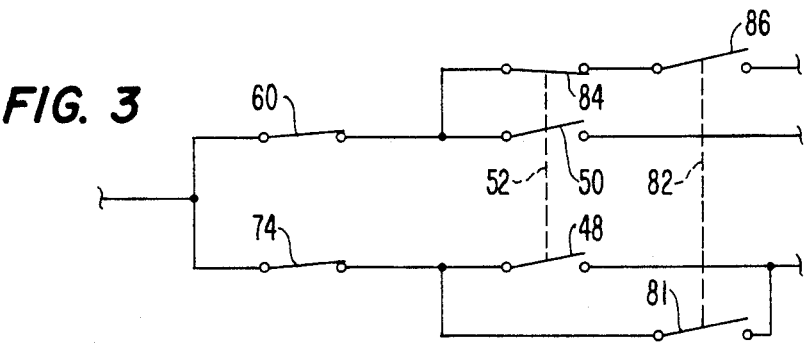

In FIG. 3, normal conditions are again shown except with the door open, and the driver out of the driver's seat, but with the selector lever 16 in its full park position and the parking mechanism is fully operative. Thus the door and seat switches 60, 74 are closed (though, should the door be closed the door switch 60 would then be open), the transmission lever switches 48 and 50 are open and switch 84 closed. Because the rooster comb 24, is in its parking position, the rooster comb switches 81, 86 are open.

Figure 4:
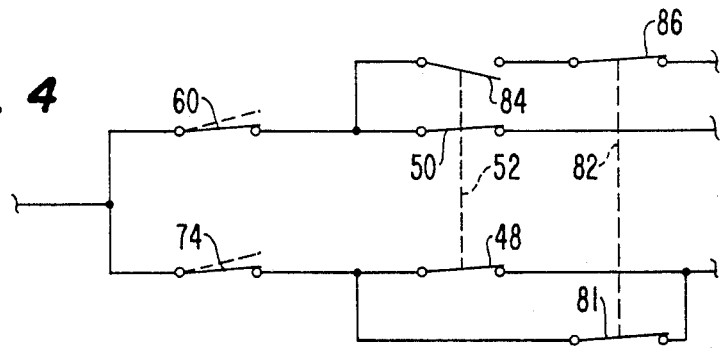

FIG. 4 illustrates a condition where the driver leaves the car or is about to leave the car without placing the shift lever 16 into its park position. Under those conditions, the shift lever controlled switches 48, 50 are closed and the switch 84 opened but if the driver is still seated in the driving position the seat switch 74 is in its open dotted line position as is the door switch 60. As soon as the driver opens the door the switch 60 moves to its full line position and the first alarm device 72 produces the first alarm signal which should be sufficient to remind the driver to move the shaft lever to its full park position. Should the driver ignore this warning, as soon as he leaves his seat, the seat switch 74 moves to its full line closed position thus causing the second alarm 80 to produce the second alarm which, because it is more strident than the first and, furthermore, is projected to the exterior of the vehicles, should be enough to remind the driver to return to the vehicle immediately and apply the transmission brake wherein all of the switches 48, 50, 81 and 86, return to their open position to disconnect the alarms.

Figure 5:
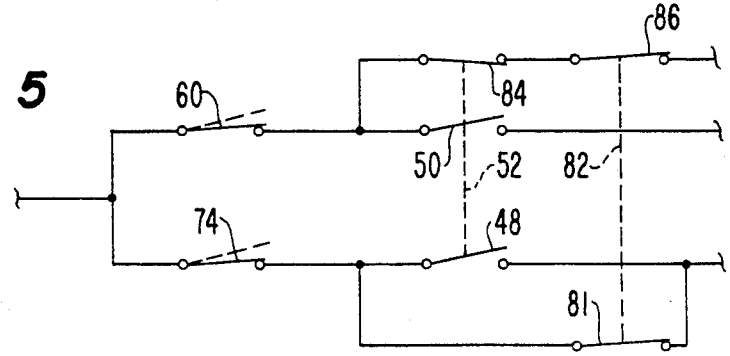

FIG. 5 illustrates the condition where the drive has opened the door and left his seat after moving the selector lever 16 fully into its park position, but, for some reason, the pawl tooth fails to engage the space 41 between two teeth 42 on the park gear 44 or the rooster comb 24 does not move into its park position. Under these conditions, the door switch 60 is either open or closed, most likely the former if it is presumed that the driver has left the vehicle and closed the door, the seat switch 74 is closed, the shift lever switches 48, 50 are open and the switch 84 closed because it is presumed the driver has moved the lever into its full park position before leaving the vehicle but the rooster comb switches 81, 86 remain closed because the rooster comb has not moved into its park position. Thus as soon as the driver leaves his seat, the seat switch 74 closes and the second alarm 80 projects a signal to the exterior of the vehicle which should alert the driver to return to the vehicle and apply the regular emergency brake. Because the switches 86, 84 are also closed under the foregoing conditions, the third alarm 87 and/or the visual display 88 are also energized as soon as the vehicle door is opened and the door switch 60 thereby closed.

Though both alarms 80 and 87 may be used to respond to a broken or maladjusted shift linkage as described, and such is preferred since a broken shift linkage could be extremely dangerous, only the third alarms 87, 88 could be employed. However, if the second alarm 80 is connected to operate with the third alarm as shown in the drawings, the only way to disconnect the second alarm when there is a problem with the shaft linkage would be for the driver to remain in his seat. (The third alarm is disconnected as soon as the door is closed.) Since this is clearly impractical, the driver must locate the manual switch 89 to disconnect all the alarms and thereafter seek the assistance of a tow truck.

Having now described the invention, what is claimed is:

1. An alarm system for an automotive vehicle provided with an automatic transmission including a gear selector lever having a park position and a parking pawl engageable with a parking gear provided with radially extending circumferentially spaced teeth for parking said vehicle in response to movement of said gear selector lever to said park position;
   (a) first and second control switches positioned to close when the gear selector lever is set to any position other than the park position;
   (b) a third control switch in series with one of said first and second control switches and positioned to close when a door of the automotive vehicle is opened;

(c) a first alarm device in series with said third control switch and said one of said first and second control switches for producing a first alarm signal when both of said switches are closed;

(d) a fourth control switch in series with the other of said first and second control switches and positioned to close whenever a driver leaves his seat in the automotive vehicle; and (e) a second alarm device in series with said fourth control switch and the other of said first and second control switches for producing a second alarm signal distinctly different from said first alarm signal when both of said fourth control switch and said other of said first and second control switches are closed.

2. An alarm system according to claim 1 including a shift linkage connected between said gear selector, lever and said parking pawl, a fifth control switch in series with said fourth control switch and said second alarm device and positioned to be closed whenever said shift linkage is in any position except park, said second alarm device producing said second alarm signal when both of said fourth and fifth control switches are closed.

3. An alarm system according to claim 2 wherein said shift linkage includes a rooster comb and said fifth switch is positioned to be operated directly by said rooster comb.

4. An alarm system according to claim 1 including a shift linkage between said gear selector lever and said parking pawl, a fifth control switch in series with said third control switch and positioned to be closed only when said shift lever is in its park position, a sixth switch in series with said third and fifth switches and positioned to be closed whenever said shift linkage is in any position except park, and a third alarm device in series with said third, fifth and sixth switches for producing a third alarm signal distinctly different from said first and second alarm signals when said third, fifth and sixth switches are closed.

5. An alarm system according to claim 4 wherein said fifth and sixth switches are in parallel with said one of said first and second control switches, and said third alarm device produces said third alarm signal whenever said third, fifth and sixth switches are closed regardless of the open or closed condition of said one of said first and second control switches.

6. An alarm system according to claim 4 wherein said shift linkage includes rooster comb and said fifth switch is positioned to be operated directly by said rooster comb.

7. The alarm system of claim 1 wherein said first alarm signal of said first alarm device is signaled primarily within said automotive vehicle and said second alarm signal of said second alarm device is signaled primarily to the exterior of said automotive vehicle.

8. The alarm system of claim 1 including manually operable switch means carried by said automotive vehicle and movable between open and closed positions for selectively connecting and disconnecting said alarm system for an electrical power source of said automotive vehicle.

9. The alarm system of claim 8 wherein said manually operable switch means includes manual switch control means located on said automotive vehicle in a position not readily accessible to the occupants of the vehicle.

10. The alarm system of claim 9 including detent means for releasably retaining said manually operable switch means in either of its open or closed positions, solenoid means for automatically actuating said manually operable switch means from its open to its closed position upon starting of said vehicle, and additional switch means for automatically disconnecting said solenoid means from a power source for the vehicle in response to automatic actuation of said manually operable switch means from its open to its closed positions.

11. An alarm system for an automotive vehicle provided with an automatic transmission including a gear selector lever selectively movable between parking and operating positions, a shift linkage operable by said gear selector lever between said parking and operating positions, a first control switch positioned to be closed only when said gear selector lever is in park position, a second control switch in series with said first control switch and positioned to close when a door of the automotive vehicle is opened, a third control switch in series with said first and second control switches and positioned to be closed when said shift linkage is in any position except part, and an alarm device in series with said first, second and third switches for producing an alarm signal whenever said first, second and third switches are closed.

12. The alarm system of claim 11 wherein said third switch is arranged so that it can move to its closed position when said first switch is closed only in the event of and in response to a break in or a maladjustment of said shift linkage, said alarm device signalling said event.

* * * * *